United States Patent [19]
Colgate et al.

[11] Patent Number: 5,594,889
[45] Date of Patent: Jan. 14, 1997

[54] MEMORY RESOURCE ALLOCATION LOOK AHEAD SYSTEM AND METHOD

[75] Inventors: William K. Colgate, Kirkland; Kelly C. Green, Woodinville, both of Wash.

[73] Assignee: Digital Equipment Corporation, Maynard, Mass.

[21] Appl. No.: 451,836

[22] Filed: May 30, 1995

Related U.S. Application Data

[63] Continuation of Ser. No. 817,466, Jan. 3, 1992, abandoned.

[51] Int. Cl.[6] .................................................. G06F 12/02
[52] U.S. Cl. .............................. 395/497.02; 395/421.02
[58] Field of Search ....................... 395/421.02, 497.02

[56] References Cited

U.S. PATENT DOCUMENTS 5,226,155  7/1993  Iijima ........................... 395/600
5,247,660  9/1993  Ashcraft et al. .................. 395/600

*Primary Examiner*—Reba I. Elmore
*Attorney, Agent, or Firm*—Ronald C. Hudgens; Krishnendu Gupta

[57] ABSTRACT

A memory resource allocation look ahead system is implemented in event logger (14), operating in conjunction with one or more event sinks (18). When the event logger (14) is called, all information in the argument fist is copied into an event buffer maintained by the logger (14), and the buffer is placed at the input end of queue (44). The event sinks 18 contain a similar queue. In operation of the event logger 14, an evd_get_event routine is used to obtain event reports from the event queue (44). The evd_get_event routine includes a next_size_hint argument, giving the size of the event record that will be obtained with the next call to evd_get_event. The next_size_hint argument is used to allocate memory for the next call to evd_get_event.

11 Claims, 4 Drawing Sheets

MEMORY RESOURCE ALLOCATION LOOK AHEAD SYSTEM AND METHOD

This application is a file wrapper continuation of U.S. Ser. No. 07/817,466 filed Jan. 3, 1992 now abandoned.

BACKGROUND OF THE INVENTION

1. Field of the Invention

The present invention relates generally to memory management. More particularly, it relates to a way to optimize memory utilization for reading a stream of variable length records. Most especially, it relates to a way of piggy-backing information concerning the memory requirements of a subsequent data transfer operation with a current operation.

2. Description of the Prior Art

Two methods are known in the art to facilitate passing of data across address spaces:

1) A two pass operation: 'A' query from 'A' to 'B' that asks 'B' how much data will be sent. 'A' allocates the necessary memory, then asks 'B' to pass the data.

2) Maximum allocation: 'A' allocates the pre-agreed maximum memory, then asks 'B' to pass the data.

The disadvantage of method 1 is that two passes are necessary to acquire the knowledge of how much memory to allocate. Two passes (ask for the size, then transfer the data) will require two address space context shifts. The disadvantage of method 2 is that memory utilization of 'A' is poor. 'A' always allocates the largest amount of memory for an unknown amount of data. As a result there will be unused memory that has been allocated.

SUMMARY OF THE INVENTION

These and related disadvantages may be eliminated through use of the novel memory resource allocation look ahead system and method herein disclosed. A memory resource allocation look ahead system in accordance with this invention has a first memory portion storing data and a second memory portion for temporarily storing pieces of fine data from the first memory portion to be used in data processing operations by a processor. A event dispatches transfers data from the first memory portion for the second memory portion in at least first and second steps. The event dispatcher appends a size estimate of a second data piece to be transferred in the second step with a first data piece of the first step. The event dispatches allocates memory in the second storage portion corresponding to the estimated size of the second data piece to be transferred in the second step.

A memory resource allocation look ahead method in accordance with the invention includes temporarily storing pieces of the data from a first memory portion in a second memory portion to be used in data processing operations by a processor. Data from the first memory portion is retrieved for the second memory portion in at least first and second steps, including a size estimate of a second data piece to be retrieved in the second step with a first data piece of the first step. Memory in the second storage portion is allocated corresponding to the estimated size of the second data piece to be retrieved in the second step.

The attainment of the foregoing and related advantages and features of the invention should be more readily apparent to those skilled in the art, after review of the following more detailed description of the invention, taken together with the drawings, in which:

DETAILED DESCRIPTION OF THE INVENTION

Figure 1:
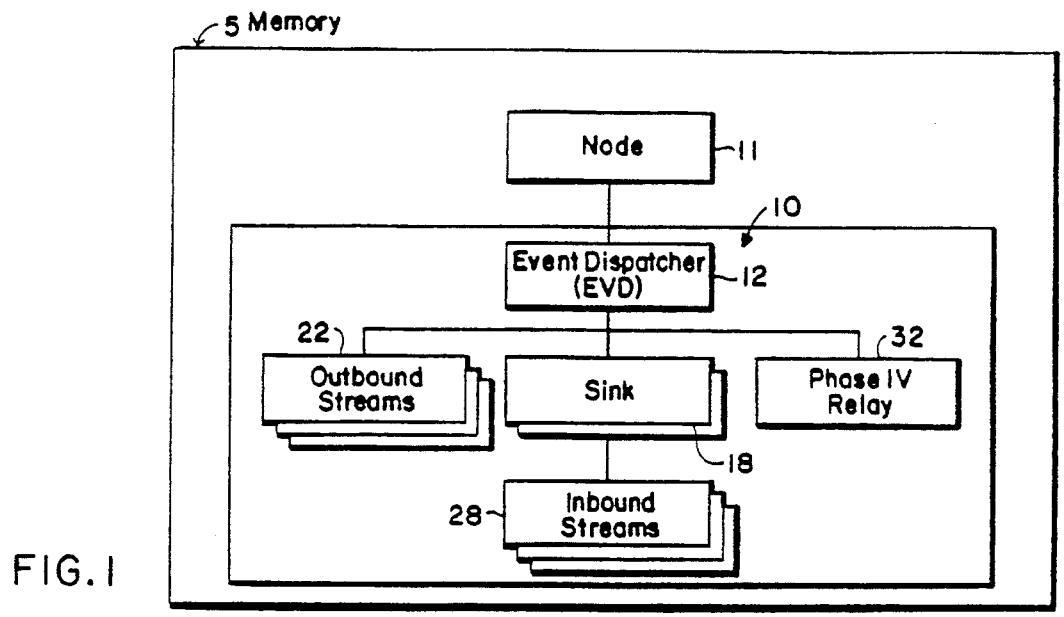
FIG. 1 is a system in which the memory resource allocation look ahead system and method of the invention is used.
Figure 2:
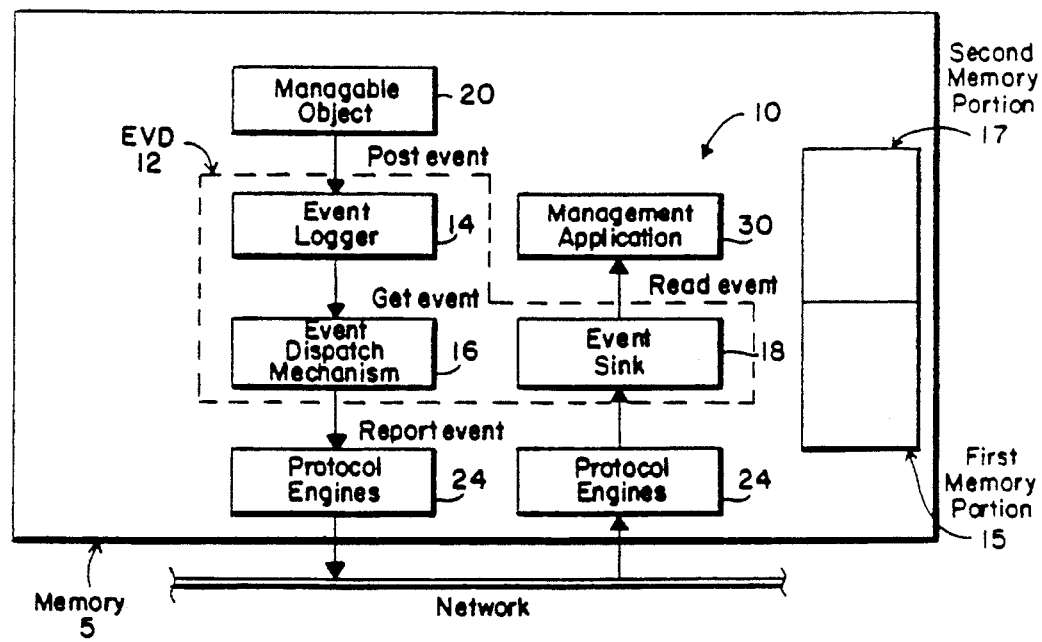
FIG. 2 is a block diagram of an event dispatcher management facility in the system of FIG. 1 incorporating the memory resource allocation look ahead system and method of the invention.

Turning now to the drawings, more particularly to FIGS. 1 and 2, the memory resource allocation look ahead system and method will be described in the context of a network operating system 10 contained in node 11 and incorporating an event dispatcher (EVD) 12. As shown in FIG. 1, the network operating system 10, resides in memory 5. While the memory resource allocation look ahead system and method is especially suited for use in such an EVD, it should be understood that it can be used for memory management in a wide variety of other environments as well. The EVD 12 is a management facility that allows a manageable object to declare the occurrence of significant object state changes, called an event report, or simply an event. Events are distributed to interested management applications that may then choose to act upon them.

Functionally, the EVD 12 is divided into three major components. These are the event logger 14, the event dispatch mechanism 16 and the event sink 18. The event logger 14 is the component that is responsible for accepting events from all of the manageable objects 20 on the system 10. The events are held in a queue until fetched by the EVD 12. The event dispatcher fetches events in first-in first-out (FIFO) order from the logger 14. As each event is fetched, it is assigned a universal identifier (UID) and placed on every active output stream 22. Each output stream 22 is characterized by a destination, and by several filters, that are used to discard uninteresting events. Events which pass all filters are then sent, still in FIFO order, to the output stream's destination.

Events that pass the filters for an output stream are encoded in one of several management protocols by a protocol engine 24, and then transmitted to the stream's destination sink 18. Output streams from many systems may all converge on a given sink 18. If the sink is present on the same system as the EVD 12, it is not necessary to encode and decode the event into any management protocol. The event may be passed directly to the inbound stream 28. It is the responsibility of the protocol engine to determine when this optimization may occur, and to invoke the local transport mechanism. The sink 18 merges event records into a single queue from multiple input streams 28 and applies a series of filters to discard uninteresting events. The remaining events are then retained by the sink 18 until retrieved by a management application 30.

EVD 12 is a manageable facility, supporting dispatcher, stream, filter, sink and relay entities. For naming purposes, these entities are arranged in a containment hierarchy as shown in FIG. 1. Note that the relay entity 32 exists only for compatibility with the network event reporting facility of DECnet Phase IV, and is not essential to EVD 12.

Figure 3:
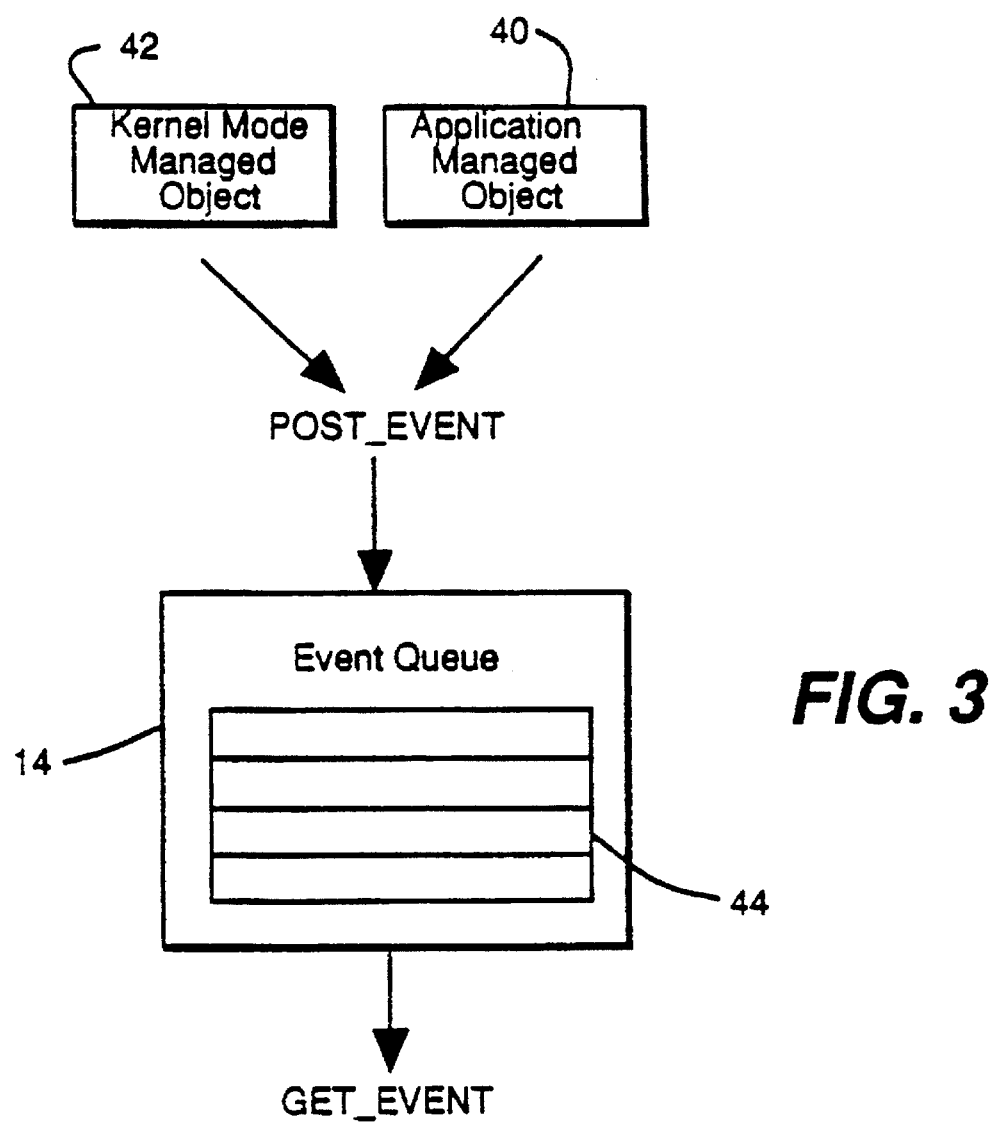
FIG. 3 is a more detailed block diagram and flow chart of a portion of the event dispatcher management facility of FIG. 2.

FIG. 2 shows the relationships between the event-emitting manageable object 20, event logger 14, event dispatch mechanism 16, event sink 18, and event-consuming management application 30. Further, as shown in FIG. 2, the event-emitting manageable object 20, event logger 14, event dispatch mechanism 16, event sink 18, and event-consuming management application 30, resides in memory 5. Also as shown, memory 5 also comprises a first memory portion 15, and a second memory portion 17. The memory resource allocation look ahead system is implemented in the event logger 14, further details of which are shown in FIG. 3, operating in conjunction with one or more event sinks 18. In order to prevent unnecessarily limiting implementations of manageable objects, the event logger 14 must be capable of accepting event postings from application code 40, as well as from kernel components 42 of the host operating system.

When the event logger 14 is called, all information in the argument list is copied into an event buffer maintained by the logger 14, and the buffer is placed at the input end of queue 44. Posting an event report is always successful, since at least a lost-event report will be stored. The event sinks 18 contain a similar queue (not shown).

The event logger 14 must preserve the order in which events are reported. This may be different from the temporal order in which the events actually occurred, since a time stamp is obtained by the manageable object at the event occurrence, while the actual posting occurs later.

In operation of the event logger 14, an evd_get_event routine is used to obtain event reports from an event queue 44. The evd_get_event routine is as follows:

```
evd_status
evd_get_event(
    queue_handle        *handle
    boolean             no_wait,
    event_report        *event_buffer
    int                 buffer_size,
    int                 *returned_size,
    int                 *next_size_hint
);
```

Figure 4:
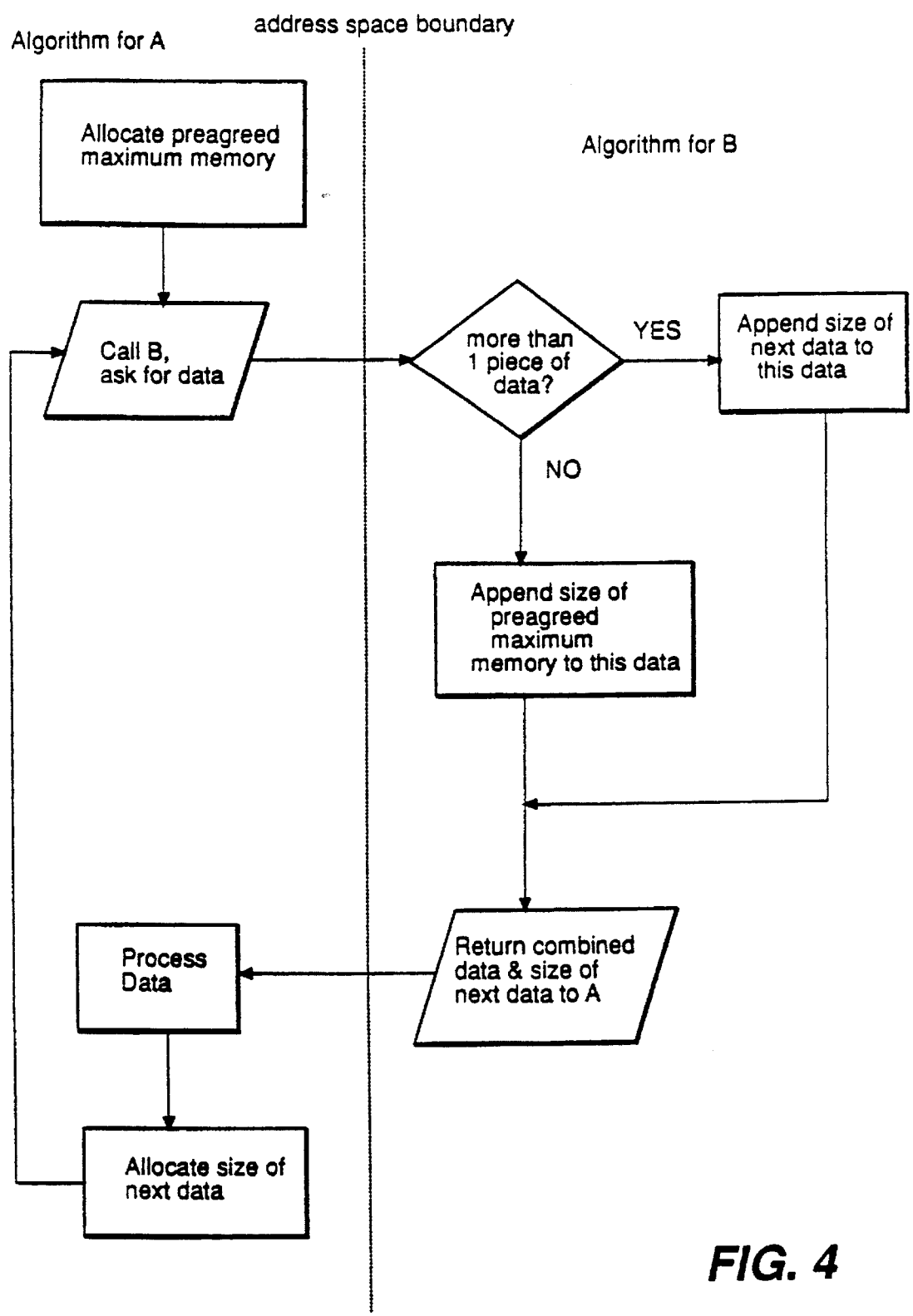
FIG. 4 is a flow chart of the memory resource allocation look ahead method of the invention.

Further information on the evd_get_event routine is provided in the following table:

FIG 4 is a flow chart of the memory resource allocation look ahead method when the evd_get_event routine is executed with the next_size_hint parameter. Shown in FIG. 4 are two co-operating algorithms, algorithm A and algorithm B, that are exchanging data. Algorithms A and B are shown in FIG. 4 as operating in separate portions of memory and as having an address space boundary separating the two. As shown in FIG. 4, algorithm A starts out by allocating a memory block equal in size to a maximum predetermined size. Next, algorithm A calls algorithm B and asks algorithm B to fill this memory block. Further, as shown, algorithm B, upon receiving this request, first checks to see if it has more than 1 unit or pieces of data to transfer. If algorithm B has only 1 piece of data to transfer, it then appends a predetermined maximum size as the size of the next data piece to be transferred and transfers the first piece of data to algorithm A alongwith the appended size information in the first data transfer step. Also as shown in FIG. 4, if algorithm B has more than one piece of data to transfer it appends to the first data piece an estimate of the size of the second data piece to be transferred in the second data transfer step. Further as shown in FIG. 4, algorithm A uses the size information transferred with the first data piece to allocate a memory block corresponding to the appended size information of the subsequent data transfer from algorithm B to algorithm A. Further, as shown in FIG. 4, the size estimate appended with the first data piece could also be the actual size of the data to be transferred in the second data transfer step.

Figure 5:
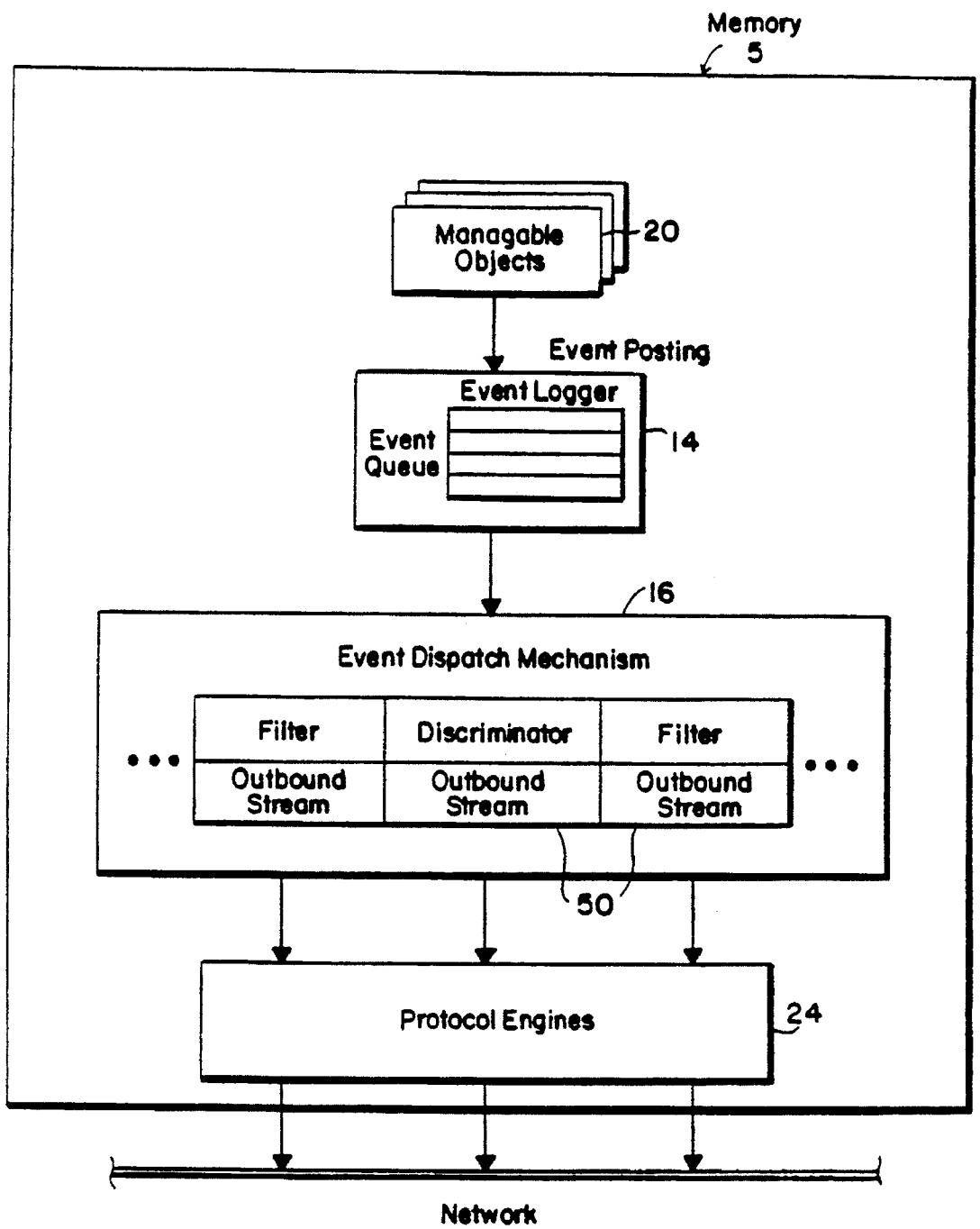
FIG. 5 is a more detailed block diagram and flow chart of another portion of the event dispatcher management facility of FIG. 2.

Further details of the event dispatch mechanism 16 are shown in FIG. 5. To accomplish its tasks, each of the event dispatcher's outbound streams 50 must form a long-term association with the corresponding target sink 18. The event dispatcher utilizes the services of a protocol engine 24 to do so. Each outbound stream may operate a different protocol, and therefore a different protocol engine 24.

It should be apparent to those skilled in the art that the system and method of this invention optimizes memory utilization when reading a stream of variable length records. By piggy-backing information concerning the memory requirements of a subsequent data transfer with a current data transfer operation, the invention allows memory to be allocated in closer correspondence to actual anticipated requirements, rather than in an arbitrary predetermined size.

It should further be apparent to those skilled in the art that various changes in form and details of the invention as shown and described may be made. It is intended that such changes be included within the spirit and scope of the claims appended hereto.

| evd_get_event Call Arguments | | | |
|---|---|---|---|
| Parameter | Direction | Status | Description |
| handle | Input | Required | The opaque handle given to the caller when the queue was accessed. |
| no_wait | Input | Required | If TRUE, evd_get_event will return an error if no event report is available. If false, evd_get_event blocks the caller until an event report is available. |
| event_buffer | Output | Required | A pointer to a buffer into which the returned event is placed. |
| buffer_size | Input | Required | The total size of the event buffer. |
| returned_size | Output | Optional | The size of the event record placed into the event buffer. |
| next_size_hint | Output | Optional | A hint giving the size of the event record that will be obtained with the next call to evd_get_event. The hint is an upper limit, that is, the next event may actually be smaller. The maximum event size will be returned if no better guess can be made. |

What is claimed is:

1. A resource allocation system for memory comprising:

a first memory portion for storing data;

a second memory portion for temporarily storing pieces of the data from the first memory portion to be used in data processing operations by a processor; and an event dispatcher means for transferring data from the first memory portion to the second memory portion in at least first and second steps, said event dispatcher means appending a size estimate of a second data piece to be transferred in the second step with a first data piece transferred from the first memory portion to the second memory portion of the first step, the event dispatcher means also allocating memory in the second memory portion corresponding to the size estimate of the second data piece to be transferred in the second step.

2. The control system for a memory of claim 1 in which said means for retrieving data is configured to append a preagreed maximum size to the first data piece of the first step in absence of an identified second data piece when the first data piece is retrieved.

3. The control system for a memory of claim 1 in which the first and second data pieces comprise event records for a data processing system including the memory and the processor.

4. The control system for a memory of claim 3 in which the data processing system is a networked data processing system.

5. A method for allocation of a memory, the memory including a first memory portion for storing data and a second memory portion for temporarily storing pieces of the data from the first memory portion to be used in data processing operations by a processor, comprising:

retrieving data from the first memory portion for the second memory portion in at least first and second steps;

including a size estimate of a second data piece to be retrieved in the second step with a first data piece of the first step, the size estimate of the second data piece being appended with the first data piece; and allocating memory in the second memory portion corresponding to the size estimate of the second data piece to be retrieved in the second step.

6. The method for allocation of a memory of claim 5 in which the size estimate is a preagreed maximum size to the first data piece of the first step in absence of an identified second data piece when the first data piece is retrieved.

7. The method for allocation of a memory of claim 5 in which the first and second data pieces comprise event records for a data processing system including the memory and the processor.

8. The method for allocation of a memory of claim 5 in which the data processing system is a networked data processing system.

9. The control system of claim 1 wherein the first memory portion is kernel memory and the second memory portion is user space memory.

10. The method for allocation of a memory of claim 5 wherein the first memory portion is kernel memory and the second memory portion is user space memory.

11. A method for allocation of a memory, the memory including a first memory portion for storing data and a second memory portion for temporarily storing pieces of the data from the first memory portion to be used in data processing operations by a processor, comprising:

determining a number of data pieces to be retrieved from the first memory portion for the second memory portion;

wherein the number of data pieces to be retrieved from the first memory portion is greater than one, retrieving data from the first memory portion for the second memory portion in at least first and second steps, a first data piece being retrieved in the first step and a second data piece being retrieved in the second step;

appending a size estimate of the second data piece to be retrieved in the second step with the first data piece of the first step;

allocating memory in the second memory portion corresponding to the size estimate of the second data piece to be retrieved in the second step; and wherein the number of data pieces to be retrieved from the first memory portion is one, retrieving data from the first memory portion for the second memory portion in a first step;

appending a predetermined amount as size of a data piece to be retrieved in a later step with the first data piece of the first step; and allocating memory in the second memory portion corresponding to the predetermined amount for the data piece to be retrieved in the later step.

* * * * *